United States Patent [19]

Schneider et al.

[11] Patent Number: 5,488,716
[45] Date of Patent: Jan. 30, 1996

[54] FAULT TOLERANT COMPUTER SYSTEM WITH SHADOW VIRTUAL PROCESSOR

[75] Inventors: Fred B. Schneider, Ithaca, N.Y.; Butler Lampson, Cambridge; Edward Balkovich, Acton, both of Mass.; David Thiel, Colorado Springs, Colo.

[73] Assignee: Digital Equipment Corporation, Maynard, Mass.

[21] Appl. No.: 182,311

[22] Filed: Jan. 14, 1994

Related U.S. Application Data

[63] Continuation of Ser. No. 783,519, Oct. 28, 1991, abandoned.

[51] Int. Cl.$^6$ ..................................................... G06F 11/34
[52] U.S. Cl. ................................. 395/182.08; 364/944.2; 395/182.11
[58] Field of Search ......................... 395/575; 364/228.3, 364/230, 230.2, 230.3, 266, 276, 941, 941.1, 943.9, 943.91, 944.2, 944.61; 371/8.1, 9.1

[56] References Cited

U.S. PATENT DOCUMENTS

| | | | |
|---|---|---|---|
| 3,810,119 | 5/1974 | Zieve | 340/172.5 |
| 4,456,952 | 6/1984 | Mohrman et al. | 364/200 |
| 4,521,871 | 1/1985 | Galdun et al. | 364/900 |
| 4,787,041 | 11/1988 | Yount | 364/900 |
| 4,817,091 | 3/1989 | Katzman et al. | 364/200 |
| 4,965,717 | 10/1990 | Cutts, Jr. et al. | 364/228.3 |
| 5,155,729 | 10/1992 | Rysko et al. | 371/9.1 |
| 5,157,663 | 10/1992 | Major et al. | |
| 5,235,700 | 8/1993 | Alaiwan et al. | 395/575 |
| 5,295,258 | 3/1994 | Jewett et al. | 395/575 |
| 5,363,503 | 11/1994 | Gleeson et al. | 395/575 |

FOREIGN PATENT DOCUMENTS 0398694 11/1990 European Pat. Off. .

OTHER PUBLICATIONS

Patent Abstracts of Japan, vol. 011, No. 334 (P–631) 31 Oct. 1987 & JP, A.62 115 547, 27 May 1987.

Primary Examiner—Robert W. Beausoliel, Jr.
Assistant Examiner—T. Tu
Attorney, Agent, or Firm—Arthur W. Fisher; Denis G. Maloney; Lindsay G. McGuinness

[57] ABSTRACT

A fault-tolerant computer system has primary and backup computers. Primary and backup virtual machines running on the computers are controlled by corresponding virtual machine monitors. The virtual machines execute only user-mode instructions, while all kernel-mode instructions are trapped and handled by the virtual machine monitors. Each computer has a recovery register that generates a hardware interrupt each time that a specified number of instructions, called an epoch, are executed. Prior to failure of the primary computer, the backup computer's virtual machine monitor converts all I/O instructions into no-ops and the primary computer sends copies of all I/O interrupts to the backup computer. To ensure that the instruction streams in the primary and backup virtual machines are identical and that all instructions for handling interrupts and traps are executed at exactly the same point in the two virtual machines' instruction streams, all interrupts and traps that occur on the primary computer during an epoch are buffered by the virtual machine monitor. At the end of each epoch, the buffered interrupts and traps are delivered to the primary computer's virtual machine and a message is sent to the backup computer allowing the just completed epoch to be executed by the backup virtual machine. Whenever a failover occurs, all I/O operation completed interrupts from the epoch in which the failure occurred are deleted, and "disconnected" interrupts are generated for all I/O devices in use. The backup virtual processor re-connects to the i/O devices and then reissues outstanding I/O operations for which a operation completed interrupt was not received. As a result, processor failures look like ordinary I/O device failures to the software running in the backup virtual machine.

16 Claims, 4 Drawing Sheets

Message From Primary To Backup Re Interrupt:

| Epoch# | Interrupt Class | Data |

FAULT TOLERANT COMPUTER SYSTEM WITH SHADOW VIRTUAL PROCESSOR

This application is a continuation of application Ser. No. 07/783,519 filed Oct. 28, 1991, now abandoned.

The present invention relates generally to fault tolerant computer systems and particularly to methods and systems for providing fault tolerance that is independent of the computer's operating system software.

BACKGROUND OF THE INVENTION

The basic scheme used in most fault tolerant computer systems is to employ a primary and a backup computer. Users interact with the primary computer in order to obtain a service. The primary computer performs the tasks requested by users and informs the backup of its actions so that the backup can take over providing the service if the primary computer fails. Thus, hardware failures in the primary computer do not cause interruption of service to the users.

In a properly implemented instance of this scheme, the backup processor must generate no interactions with its environment before the primary computer has failed. And, after the primary computer has failed, the backup processor must generate interactions with its environment in such a way that the environment is unaware of the primary computer's failure.

Fault tolerance in computers is usually implemented either (A) by constructing special purpose computer hardware, or (B) by modifying the computer's operating system. The special purpose hardware approach requires hardware that is intimately related to the computer processor's design. As a result, such computers are usually unnecessarily costly for clients who do not require fault tolerance.

The major problem associated with using special purpose operating system code to implement fault tolerance is that the only operating system that can be used on that computer system, and still maintain fault tolerance, is the operating system containing the special purpose code. If a user who needs fault tolerance wants to use another operating system with the computer, extensive (and thus expensive) changes to this second operating system will be required.

The goals of the present invention are (1) to provide a fault tolerant computer system with little or no added cost for clients and processes that do not require fault tolerance, and (2) to provide a fault tolerance mechanism that works regardless of the operating system software used by the system's clients. While the "special-purpose hardware" and "modified operating system" approaches are both capable of meeting the basic requirements for a fault-tolerant computer system, the present invention overcomes cost problems associated with the "special-purpose hardware" approach and provides more flexibility in terms of operating system selection than the "modified operating system" approach.

SUMMARY OF THE INVENTION

In summary, the present invention is a fault-tolerant computer system having a primary computer and backup computer, both of which are capable of delaying delivery of interrupts to the computer's operating system due to aysnchronous activity by associated components (e.g., I/O devices) and the use of instruction pipelining. Primary and backup virtual processors running on the computers are controlled by corresponding virtual machine monitors. Only programs that need to be fault tolerant are run on both the primary and backup virtual processors. Programs that do not need to be fault tolerant are run on other virtual processors on the primary computer. The computer hardware directly executes only user-mode instructions of the virtual processors, but all kernel-mode instructions (e.g., I/O instructions) are trapped and handled by the virtual machine monitors.

Each computer also has a recovery register that can be loaded with a value and that generates a hardware interrupt after a corresponding number of instructions are executed. The hardware interrupts generated by the recovery register mark the boundary between "epochs" in the instruction stream.

Prior to failure of the primary computer, the backup virtual processor generates no interactions with its environment. To accomplish this, the backup computer's virtual machine monitor converts all I/O instructions into no-ops (i.e., null operations). Furthermore, the primary computer sends copies of all I/O interrupts destined for delivery to the primary virtual processor also to the backup computer so that the virtual processor in the backup computer receives the same responses as the virtual processor running in the primary computer.

To ensure that the instruction streams in the primary and backup virtual processors are identical and that all instructions for handling interrupts and traps are executed at exactly the same point in the two virtual processors' instruction streams, all interrupts and traps that occur on the primary computer (and are destined for the primary virtual processor) during an epoch are buffered by the virtual machine monitor, with copies of the interrupts being sent to the backup computer. Then, at the end of the epoch, all the buffered interrupts and traps are delivered to the primary computer's virtual processor by the virtual machine monitor on the primary computer. In addition, a message is sent to the backup computer allowing the just completed epoch to be executed by the backup virtual processor. As a result, all interrupt and trap handling routines are executed at identical points in the instruction streams of both the primary and backup virtual processors.

Context switches and user-mode drain instructions are also handled by the virtual machine monitors so as to ensure that all resulting calls to interrupt and trap handling routines are executed at identical points in the instruction streams of both the primary and backup virtual processors.

Finally, to provide seamless transfer of I/O operations after failure of the primary computer, a special I/O protocol is defined. Whenever such a failure occurs, all I/O operation interrupts signifying operation completion that are received during the epoch in which a failure occurrs are deleted, and interrupts signifying an unknown outcome are generated for all I/O devices that are in use. When the "unknown outcome" interrupts are processed by the backup virtual processor at the beginning of the next epoch, the software in the backup virtual processor re-initiates all outstanding I/O operations for which a "completed" interrupt was not received. As a result, processor failures look like ordinary I/O device failures to the software running in the backup virtual processor. Furthermore, programs that correctly cope with ordinary I/O failures will work correctly even when I/O operations are outstanding during a fail-over.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1:
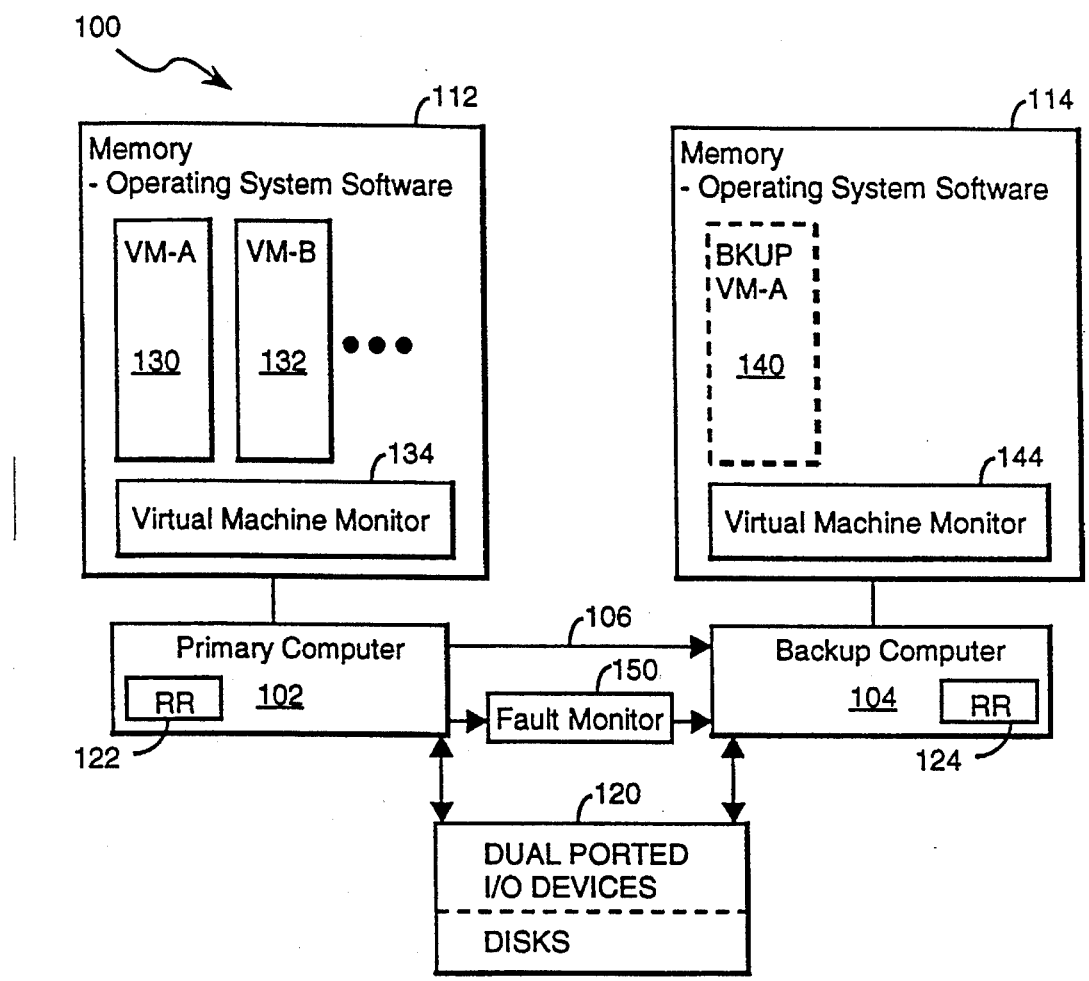
FIG. 1 is a block diagram of a fault tolerant computer system in accordance with the present invention.

FIG. 1 shows a fault tolerant computer system 100 having a primary computer 102, a backup computer 104 and a FIFO communication channel 106 used primarily for transferring information from the primary to the backup computer. Each computer has its own primary memory 112, 114, but the two share use of other input/output (I/O) devices 120, including disk storage devices and any other secondary memory devices that are used by software in both computers.

Virtual Machine Monitor

Before discussing how the two computers 102 and 104 work together in the preferred embodiment, it is important to first explain the "virtual machine" configuration of the software in just one of the machines 102 because the fault tolerance methodology of the present invention makes use of "virtual machines" 130, 132 and a virtual machine monitor 134.

The use of virtual machines and virtual machine monitors by International Business Machines in conjunction with the IBM360/67, IBM370, and its successor processors is well known and well documented. The VMF370 operating system software was used to simulate multiprocessing by using only a single real processor, allowing each virtual machine to act as though it were running on a processor unto itself. One of the known properties of the virtual machine monitor technology is that it allows clients using the same computer processor at the same time to be running applications under different operating systems. This is quite different from a typical computer system, in which only one operating system can be running at a time and that operating system manages all of the system's resources on behalf of all users.

The basic idea behind the virtual machine monitor's (VMM's) operation is as follows. All instructions are divided into two groups: user-mode instructions and kernel-mode instructions. The basis of this partition is well known and documented, with respect to virtual machines, for example in Popeck and Goldberg, "Formal Requirements for Virtualizable Third Generation Architectures," Communications of the ACM, Vol. 17, No. 7, pp. 412–421, July 1974.

Figure 2:
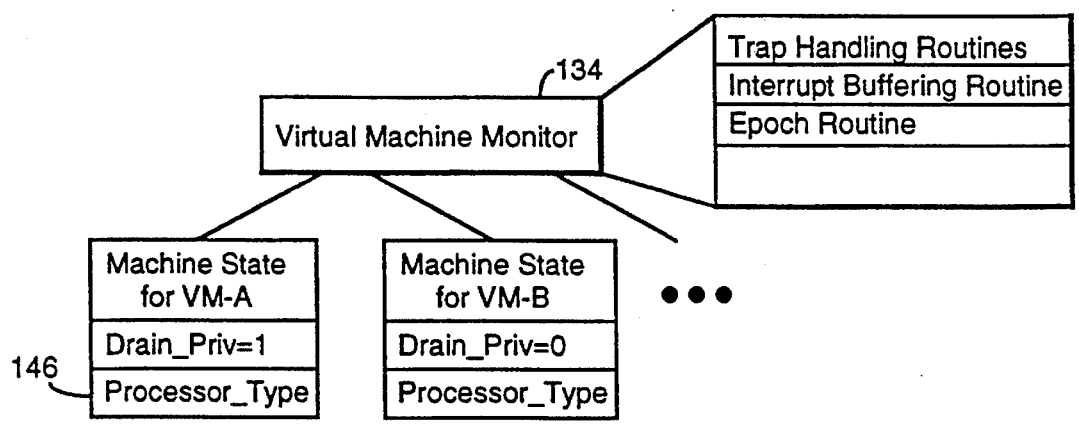
FIG. 2 is a block diagram of software routines and data structures associated with a virtual machine monitor that implements fault tolerance.

The VMM allows all user-mode instructions to be executed by the CPU without interference, while kernel-mode instructions are trapped by the VMM and then processed so as to keep track of and isolate the machine state associated with each virtual machine running on the computer (see FIG. 2). To implement this, the programs running in each virtual machine are executed in user mode, even though the virtual machine includes its own operating system. Also, the trap vectors for user-mode instruction violations are set so that control of all such traps is passed to the VMM. As a result, since the virtual machine is running in user mode, all kernel-mode instructions are automatically trapped and passed to the virtual machine monitor for handling. Finally, interrupt vectors for the (real) machine are set so that such interrupts are passed to the VMM, which then dispatches them to the correct virtual machine.

While there are, of course, many more details and complexities involved in the actual design and implementation of a virtual machine monitor, the design and implementation of virtual machine monitors is known to those skilled in the art. Therefore, this document shall discuss only those aspects of virtual machine monitors that are not already known to those skilled in the art.

For the purposes of this document, the term "virtual processor" is used interchangeably with the term "virtual machine".

Hardware Requirements for Fault Tolerant System: Recovery Register and Functional User-mode Instructions The present invention requires that the primary computer 102 and backup computer 104 both have a recovery register 122, 124. The term "recovery register" is defined herein to mean a register that is automatically decremented (or incremented) each time that an instruction is executed and that causes a hardware interrupt of type "recovery register" when its value reaches zero (or any other fixed, predefined value). Thus, on a processor that has a recovery register, it is possible to ensure that control is passed to a virtual machine monitor at a predetermined point in the instruction stream of any virtual processor. The use of the recovery register in the context of the present invention will be described below.

The present invention also requires that all user-mode instructions executed by both computers produce identical results in all cases, even in situations in which the result is normally "undefined". For instance, the processors 102, 104 must be designed so that when an error condition such as an overflow occurs, the resulting data values and virtual machine states in the two processors are identical.

Implementing Fault Tolerance With Virtual Machine Monitor

In the preferred embodiment, all programs on the primary computer 102 that need to be made fault tolerant are executed by a first virtual processor 130, while programs that do not need to be fault tolerant are executed on one or more other virtual processors 132 in the primary and backup computers. Virtual machine monitor (VMM) 134 maintains a separate machine state for each virtual processor, and generally performs the functions of a VMM as described above.

Primary virtual processor 130 and backup virtual processor 140 contain identical software, including both operating system software and application software. For this reason, the backup virtual processor 140 is also called a "shadow" virtual processor. The VMMs 134 and 144 for the primary and backup computers are not completely identical, however, because the backup computer's VMM 144 contains a state variable (herein called Processor_Type 146, see FIG. 2) indicating that virtual processor 140 is the backup virtual processor (Processor_Type=Backup). Since the backup virtual processor 140 is not supposed to affect its environment in any way (unless the primary computer has failed), all I/O instructions executed by the backup virtual processor 140 are converted into no-ops (i.e., null operations) by the backup VMM 144.

If the primary computer 102 fails, that condition is detected by a fault monitor 150, which sends a signal to the backup computer 104. The VMM 144 in the backup computer will receive this signal, causing that computer to change the Processor_Type of the virtual processor 140 to "Primary". The changeover from backup mode to primary mode by the backup VMM 144, called a fail-over, is discussed in more detail below with regard to the handling of input/output (I/O) instructions. There are many different ways of implementing a fault monitor 150 known to those skilled in the art. The type of fault monitor does not matter so long as the backup computer 104 is reliably informed whenever a hardware fault in the primary computer 102 causes that computer to stop working and the last message sent along communications channel 106 is received before the failure is signalled.

Delivery of Interrupts and Use of Epochs

For the purposes of this document, the term "interrupt" is defined to mean an asynchronous signal generated by hardware events, such as input/output interrupts, and clock interrupts. By way of contrast, "traps" are defined to mean synchronous signals generated in response to the execution of software instructions, such as traps caused by an overflow or underflow.

The major problem associated with interrupts is that because they are, by definition, asynchronous, it is difficult to control when an interrupt will be delivered to the virtual processor. In the context of the present invention, it is essential that the primary and backup virtual processors execute exactly the same instructions in exactly the same order. If asynchronous interrupts were delivered to the primary and backup virtual processors at different points in their instruction streams, this requirement would be violated. The present invention overcomes this problem by delaying the delivery of interrupts until a well defined point in the instruction streams of both the primary and virtual processors.

It should be noted that "delaying" or "buffering" interrupts and traps means storing representations of these events and preventing the virtual processors involved from immediately processing those events. Conversely, "delivering" buffered interrupts and traps to a virtual processor (or to a hardware processor) means initiating processing of those interrupts and traps by the interrupt handling and trap handling routines in the virtual processor's operating system.

All interrupts are handled by the VMM 134. More particularly, interrupts cause the computer processor to begin execution of a kernel-mode interrupt handling routine that is part of the VMM. Since interrupts are asynchronous, the VMM 134 has some freedom to delay the delivery of interrupts to its virtual processors. In accordance with the present invention, the VMM 134 exploits this freedom by delaying delivery of an interrupt so that delivery of interrupts always occurs at a planned, fixed point in a virtual processor's instruction stream. The way this is done is as follows.

Each virtual processor 130 is allowed to execute for an "epoch" comprising a known number of instructions (e.g., 100 instructions) before transferring control to the VMM 134. The two VMMs 134 and 144 running on the primary computer and backup computer must use the same scheme for computing epoch lengths to ensure that a backup virtual processor 140 transfers control to its VMM 144 at the same point in its instruction stream as the primary virtual processor 130 transfers control to its VMM 134. In the preferred embodiment, an epoch's length is determined by counting instructions executed. For any particular implementation of the present invention, the "best" epoch length is determined by balancing the following countervailing factors: (A) the overhead associated with the epoch mechanism is inversely proportional to the epoch's length, and (B) excessive delay in delivery of interrupts and traps can hurt system performance.

In one preferred embodiment, each epoch is terminated either when (A) the recovery register causes an interrupt because the specified number of instructions has been executed, or (B) a drain instruction is executed, whichever occurs first. Drain instructions are discussed more below. This modified epoch ending mechanism satisfies the criteria that all instructions for handling interrupts and traps must be executed at exactly the same point in the two virtual processors' instruction streams. Note that both virtual processors will encounter drain instructions at exactly the same points in their instruction streams.

Figures 3, 4:
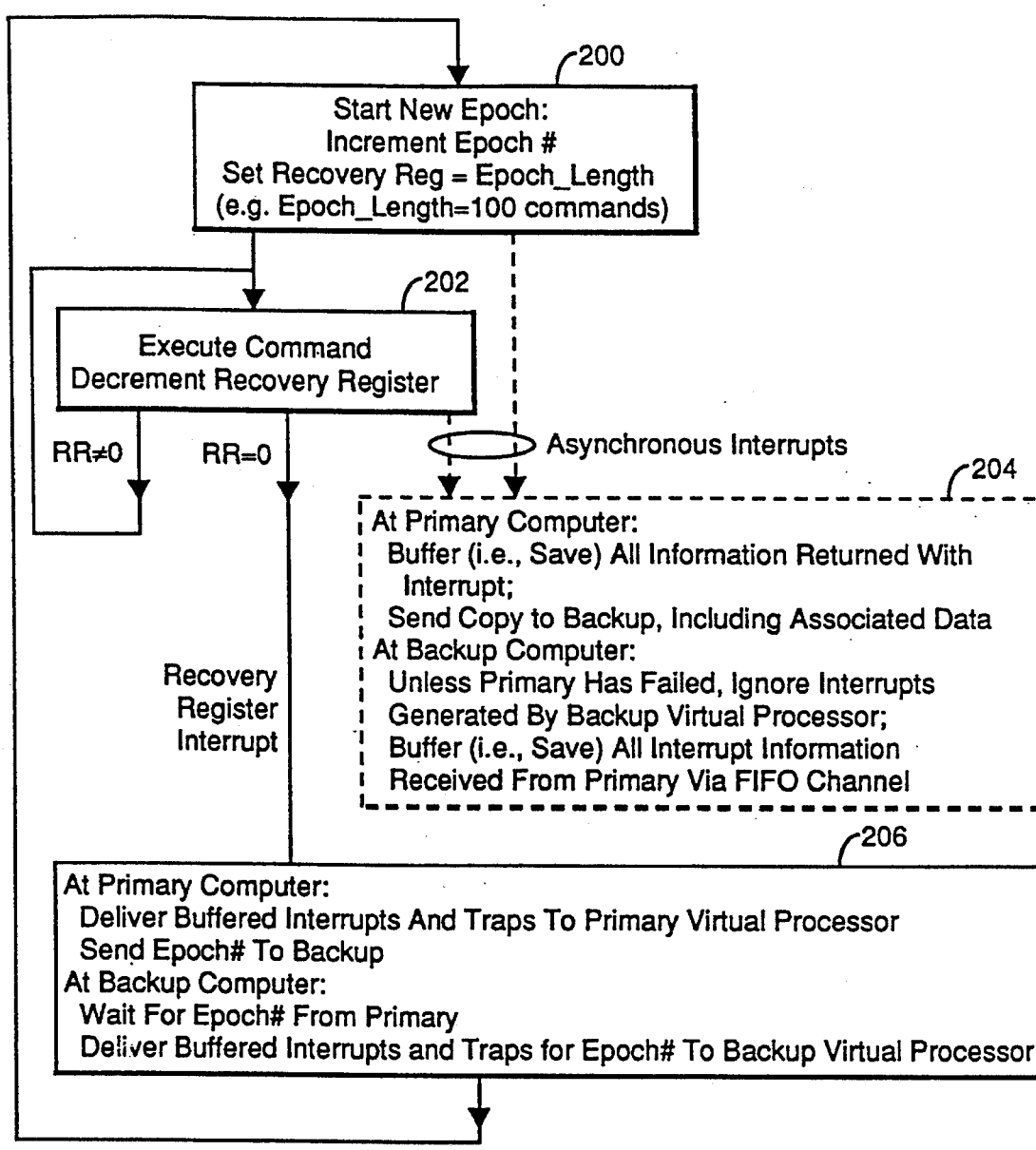
FIG. 3 is a flow chart of the epoch handling routine executed by the virtual machine monitors of the preferred embodiment.
FIG. 4 represents an interrupt information message sent from a primary computer to a backup computer.

The flow chart in FIG. 3 represents processing in both the primary and backup computers. Steps 200, 204, and 206 are handled by the Virtual Machine Monitors in the two computers, while step 202 represents the user-mode process being run by the primary and backup virtual processors.

Referring to FIGS. 1 and 3, at the beginning of each epoch, the recovery register 122, 124 (see FIG. 1) for each virtual processor 130 and 140 is set to a known value (step 200) and is decremented once for each command executed by the corresponding virtual processor (step 202). Execution of the software running in each virtual processor is allowed to continue for one "epoch" (step 202) until the recovery register reaches a value of zero. During this time, all interrupts are buffered by the VMM (step 204) and messages containing copies of those interrupts and any associated data (e.g., the data from a disk read operation) are sent to the backup computer over a first in first out (FIFO) communication channel 106 (see FIG. 1).

The copies of the buffered interrupts are delivered in the form of messages to the backup computer, and the virtual machine monitor in the backup computer is programmed to receive those messages and to treat them as though they were ordinary interrupts. Thus, the backup computer's virtual machine monitor buffers the received interrupts in the same way as the primary computer's virtual machine monitor buffers those interrupts.

The format of messages sent in step 204 that inform the backup VMM of the interrupts that occurred during each epoch on the primary computer is shown in FIG. 4. By tagging each message with the epoch number during which it was received by the primary virtual processor, the backup VMM can determine which interrupts to deliver to the backup VMM 144 at each new epoch, even if the backup computer is running more than one epoch behind the primary computer.

At the end of the epoch, when the recovery register in the primary computer 122 reaches a value of zero, all the interrupts buffered by the primary computer's VMM 134 (as well as all traps buffered by the VMM, as discussed below) are delivered to the primary virtual processor 130 (step 206), and then a message containing the number of the completed epoch is sent to the backup computer. At the backup computer, receipt of this epoch number message initiates execution of the instructions for the next epoch. This execution starts with the delivery of all buffered interrupts that were delivered to the primary virtual processor at this epoch boundary. Thus, the backup virtual processor always runs at least one epoch behind the primary virtual processor. As will be described below, this one epoch delay is required for successfully handling failures of the primary virtual processor that occur mid-epoch during the processing of I/O operations.

In alternate embodiments, the recovery register could be used to count any quantity (e.g., memory references) that allows a virtual processor's instruction stream to be broken at a predictable point.

Delivery of Delayed Traps

Traps are like interrupts, but result from execution of an instruction. Traps that are delivered immediately following execution of the causative instruction offer no problem for ensuring that a primary and a backup virtual processor execute the same sequence of instructions. This is because if an instruction causes a trap when executed by the primary virtual processor, it will cause the same trap when it is executed by the backup. Thus, the next instruction executed by the primary and the backup will be the same: the next instruction executed will be the first instruction of the trap handling routine.

When the computer hardware being used is such that trap delivery can be delayed (i.e., by the computer hardware), the exact amount of delay is typically undefined, meaning that two computers running the exact same program might deliver delayed traps at different points in the program's instruction stream. Whenever this is the case, and it often is for RISC processors (reduced instruction set computers) or when instruction pipelining is employed, other actions need to be taken to ensure that traps are delivered to the backup virtual processor at the same point in its instruction stream as where it was delivered to the primary virtual processor.

Usually, on RISC processors and other computers that use instruction pipelining techniques, the programmer can force delivery of a delayed trap. For the purposes of this discussion, we will assume that traps may be delivered at any time after they have occurred, but that all undelivered traps will be delivered by the processor upon:
(A) execution of a special user-mode "drain" instruction;
(B) a processor context switch in response to a (hardware) interrupt; or
(C) execution of an instruction that causes the processor to leave user-mode.

For example, whenever a user-mode drain instruction is executed, all traps that have been buffered by the computer hardware are flushed and delivered immediately (in, for example, the form of vectors V1 and V2) to the virtual processor that executed the drain instruction. Conventionally, the drain instruction forces immediate delivery of delayed traps, but does not force delivery of pending interrupts.

To understand the nature of the problem presented by delayed traps, consider the following situation. Suppose the primary virtual processor executes an instruction that leads to delivery of a trap. The VMM's trap handler software would actually receive control for the purpose of processing the trap. However, the VMM cannot buffer the trap, because it if does, subsequent execution of the user-mode drain instruction by the virtual processor would cause that virtual processor to receive information regarding only a subset of its delayed traps. In particular, the virtual processor would not learn of the trap already buffered by the VMM.

On the other hand, if the VMM can and does immediately deliver all traps to the primary virtual processor, then the user-mode drain instruction does not cause a problem. Since most RISC processors cannot guarantee immediate delivery of all traps, operation of the user-mode drain instruction as described above is inconsistent with the need for the primary and backup virtual processors to have identical instruction streams.

We must ensure that the same trap will be delivered to the backup virtual processor at the same point in its instruction stream. To do this, two mechanisms are used: (1) delivery at the end of each epoch of hardware buffered and VMM buffered traps, and (2) use of a modified drain instruction so as to ensure delivery of all hardware buffered and VMM buffered traps upon execution of user-mode drain instructions.

Figure 5:
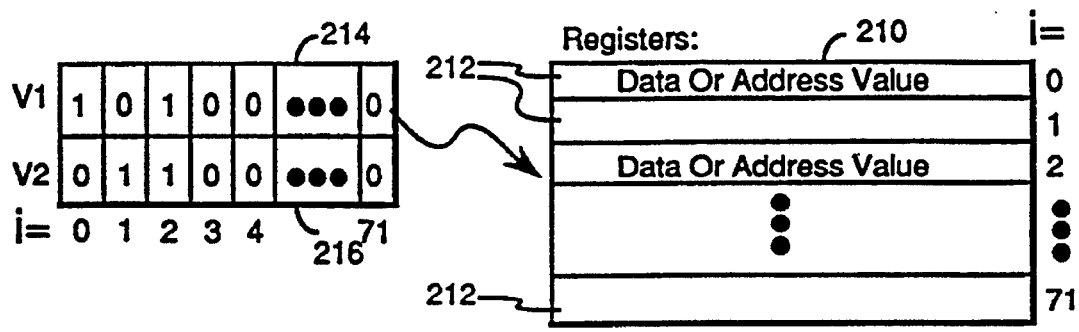
FIG. 5 represents the data structures that store buffered trap information.

The data structure used for the delivery of a set of buffered traps in the preferred embodiment is shown in FIG. 5. In particular, the computer has an array 210 of registers, where each register 212 in the array is capable of storing a data value that results from executing an instruction. In the preferred embodiment, any register 212 can be the destination associated with an instruction whose execution causes a trap.

Two vectors V1 and V2 (214, 216) are set by the computer hardware to indicate what traps have occurred, as follows:

V1(i)=1 if Register i was the destination for an instruction that caused a trap, e.g., if Register i contains a potentially erroneous value such as an overflow value;

V2(i)=1 if a Class i trap has occurred.

Using this scheme, a program will need to determine which register is associated with each type of trap, as will be understood by those skilled in the art. In alternate embodiments, data describing traps that have occurred could be stored in other ways, so long as all the traps are buffered for later processing.

During the middle of an epoch, bits associated with each delivered trap are added to copies of vectors V1 and V2 being maintained by the VMM. At the end of each epoch, vectors V1 and V2 of the VMM are delivered to the virtual processor for handling of the buffered traps.

In accordance with the present invention, while VMM 144 on the backup computer ignores interrupts delivered by its own hardware and uses instead messages received from the primary VMM 134, the backup VMM 144 processes its own traps. This is possible because the traps that occur in epoch X in the primary virtual processor will also be delivered by the end of epoch X in the backup virtual processor, since the epoch end coincides with a context switch.

Figure 6:
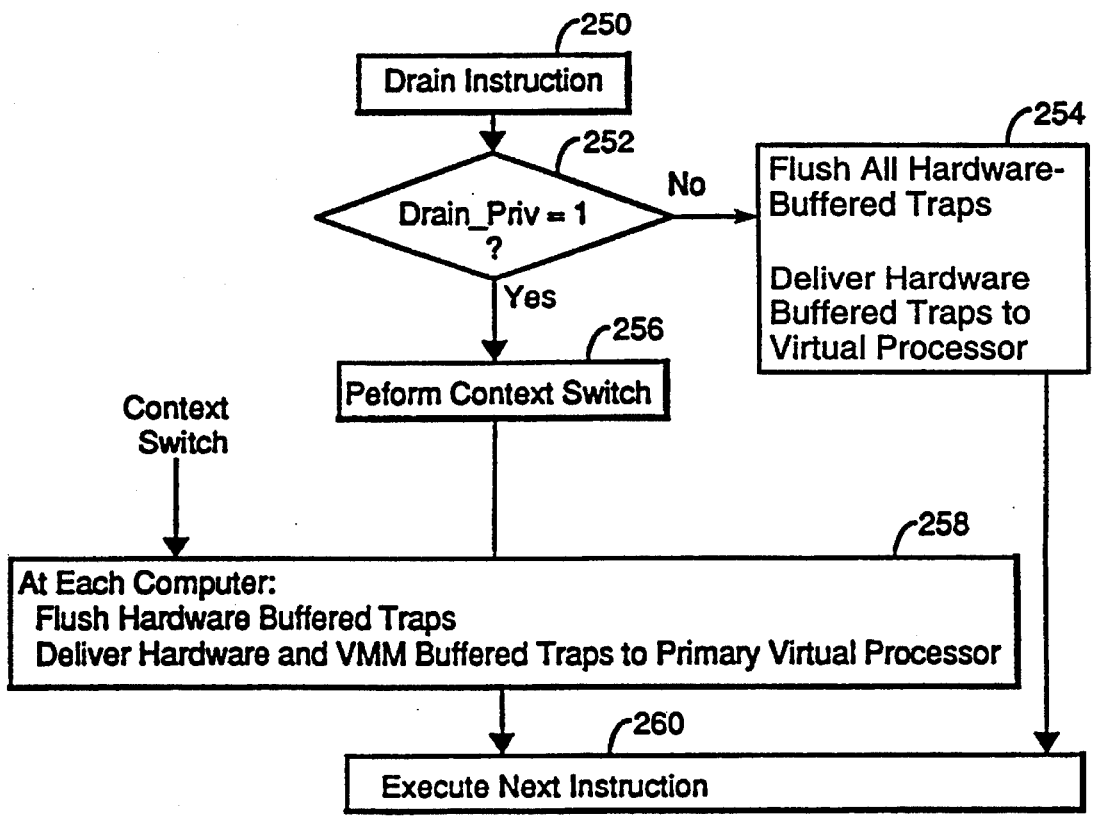
FIG. 6 is a flow chart of the process for a executing a modified user-mode drain instruction.

To overcome the problem associated with the fact that both the computer hardware and the VMM can buffer traps, the present invention modifies operation of the user-mode drain instruction as follows. As shown in FIG. 2, a new status bit, called Drain_Priv, is added to the machine state of the hardware processor. Referring to FIG. 6, when the Drain_Priv flag is reset (i.e., equal to 0), the user-mode drain instruction operates as described above (see steps 250, 252, 254). However, when Drain_Priv is equal to 1 (see step 252), execution of the drain instruction in user-mode causes an immediate context switch (step 256) to an appropriate handler. The context switch causes all traps buffered by the hardware, if any, to be flushed and delivered to the VMM 134 (step 258). The VMM 134 adds the flushed traps to those already represented by the VMM versions of vectors V1 and V2, and then immediately delivers all of the buffered traps (including both those previously buffered and those just now flushed by the drain instruction) in the form of vectors V1 and V2 to the virtual processor 130. Then, control is returned by the VMM to the virtual processor (step 260) for executing the next instruction. When the backup virtual processor reaches the same drain instruction in its instruction stream, it will perform exactly the same steps as the primary virtual processor in the same sequence.

Operation of the drain instruction is not modified for virtual processors with Drain_Priv=0, so as to minimize impact of the invention on processes not requiring fault tolerance.

In summary, when using a hardware processor that can delay the delivery of traps, the present invention (A) buffers all delivered traps in the VMM and delivers them at the start of each epoch, and (B) modifies operation of the user-mode drain instruction so as to cause a context switch, which causes hardware-buffered traps to be delivered, followed by delivery of all traps buffered by both the hardware and the VMM to the virtual processor.

One alternate embodiment of the above described process for handling drain instructions is as follows. In some situations it may not be advantageous to deliver delayed traps (in response to a drain instruction) to the virtual processor before delivery of interrupts that occurred prior to the delayed traps. To avoid this potential problem, the epoch control software in the VMMs is modified to end each epoch when (A) the recovery register reaches a value of zero due to execution of the specified number of instructions, or (B) a drain instruction is executed, whichever occurs first. By ending the epoch, control is passed to step 206 in FIG. 3, causing all delayed interrupts as well as all delayed traps to be delivered to the virtual processor.

Transparent Fail-Over For Handling I/O Operations

Figure 7:
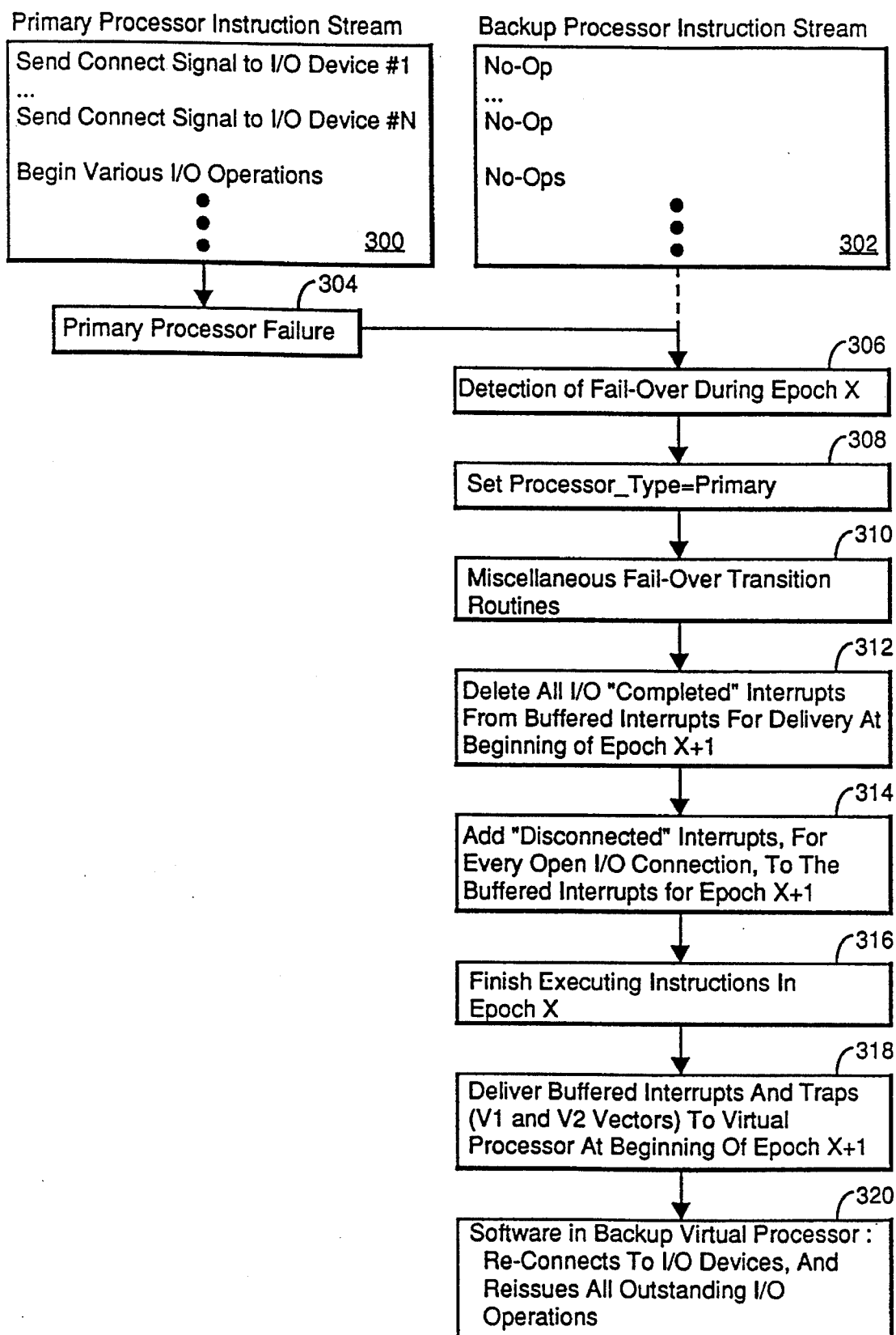
FIG. 7 is a flow chart of the process for handling I/O operations during a fail-over from the primary to the backup computer.

As discussed above with reference to FIG. 1, since the backup virtual processor 140 is not supposed to affect its environment in any way (unless the primary computer has failed), all I/O instructions executed by the backup virtual processor 140 are converted into no-ops by the backup VMM 144. Since all instructions that start I/O operations are kernel-mode instructions, they are all intercepted by the VMM 144, which then converts them into no-ops as long as the primary computer has not failed (see steps 300 and 302 in FIG. 7). Thus, only the I/O operations from the primary computer 102 affect the environment (disks, etc.)

Even though I/O operations issued by the backup virtual processor 140 are translated into no-ops, a program being executed by the backup virtual processor has no way of knowing this fact. Each I/O operation issued by the backup is necessarily also issued by the primary, and each I/O interrupt that is delivered by the primary VMM 134 to the primary virtual processor 130 is also delivered to the backup VMM 144 for delivery to the backup virtual processor 140 (see FIG. 3).

When the primary computer fails (step 304 of FIG. 7), the backup computer must take over as the new primary computer. Thus, the backup's VMM 144 must go from a mode in which it is suppressing all of the backup virtual processor's I/O operations to a mode where the backup virtual processor's operations are actually performed. This "fail-over" must be done in such a way that the environment is unaware of the primary computer's failure and is accomplished as described below.

Implementing the fail-over is made difficult by the fact that it is usually not possible for the primary computer to (1) issue an I/O operation and (2) inform the backup of this fact, all in a single atomic (indivisible) action. As a result, it is possible for the primary computer to fail between these two operations. Also, no protocol exists that ensures an I/O operation will be performed exactly once (by either the primary or else the backup) if it is possible for there to be a failure between actions (1) and (2) above. Notice that the requirement that "the environment be unaware of the primary computer's failure" is violated if an I/O operation is skipped or performed more than once just because a failure occurred at an inopportune moment.

The present invention avoids this "exactly once" problem with a new I/O interface specification. This specification is the one seen by virtual processors, and so it is what operating system programmers and applications programmers must comply with when using the present invention.

According to the present invention, I/O operations are governed by the following rules (the rules are formulated for an interrupt-based I/O interface but have analogues for other I/O models):

Rule 0: To perform an I/O operation, a processor must first issue a "connect" (which is a type of I/O operation) to the device that will perform that operation. The (virtual) processor can then issue I/O operations to that device.

Rule 1: Delivery of a "completed" interrupt for an issued I/O operation implies that the operation was performed by the device.

Rule 2: Concurrent I/O operations can be performed by the I/O device in any order.

Rule 3: Delivery of a "disconnected" interrupt from an I/O device to a processor implies that outstanding I/O operations (i.e., those for which a "completed" interrupt has not been delivered) may or may not have been performed.

An important corollary to the above rules is that when a "disconnected" interrupt is received from an I/O device and one or more outstanding I/O operations were pending for that device (i.e., for which no "completed" interrupt has been received), then the program that receives the "disconnected" interrupt (A) must issue a new "connect" and (B) must reissue the outstanding I/O operations. In other words, use of the present invention requires that systems and applications programmers write their programs so as to respond to "disconnected" interrupts in this way.

According the above described scheme for delivering interrupts, "completed" and "disconnected" interrupts are delivered to a virtual processor only at the start of epochs. Also, these interrupts are delivered to both the primary and the backup. Consequently, when the backup VMM detects that the primary computer has failed (step 306), it proceeds as follows:

The VMM on the backup computer changes the setting of an internal "processor type" variable to indicate that it is now the primary processor (step 308), and it may also execute a number of other fail-over transition routines that are not relevant to the present invention (e.g., sending a hardware failure message to the system's operator console) (step 310). Then the backup VMM proceeds to take care of I/O operations in process during the fail-over.

First, the backup VMM deletes all I/O "completed" interrupts received during the epoch in which the failure occurred (step 312). The backup VMM knows the epoch in which the failure occurred because it receives an epoch message for every epoch that the primary VMM has completed. Thus if the last epoch message received from the primary VMM prior to failure was for epoch X−1, then the failure occurred in epoch X.

Second, the backup VMM adds to the set of buffered interrupts that will be delivered at the start of epoch X+1, a "disconnected" interrupt for every I/O connection open during epoch X (step 314).

After steps 312 and 314, the backup virtual processor completes execution of epoch X (step 316), then the backup VMM delivers all buffered interrupts and traps to the backup virtual processor (step 318). Since the buffered interrupts include disconnects for all the I/O devices in use, the operating system or application software (whichever initiated connection to the I/O devices) running in the backup virtual processor will send new "connect" signals to all the I/O devices, and it will also reissue all outstanding I/O operations that were issued before epoch X+1 and for which a "completed" interrupt was not received (step 320).

The combination of these steps 312 and 314 causes fail-over from the primary computer to the backup computer to be made to look like an I/O failure insofar as the programs executing in the virtual processors 130 and 140 are concerned. Thus, programs that work correctly (i.e., in accordance with Rules 0–3) when messages to or from the I/O system are lost will also work correctly in a fault-tolerant computer system having primary and backup computers when a failure occurs during an I/O operation.

In summary, the potential problems associated with failures concurrent with outstanding I/O operations are solved by carefully not shielding the virtual processor from all failures. This allows processor failures to look like ordinary I/O device failures (such as lost I/O request messages and lost completed messages). A program that correctly copes with ordinary I/O failures and that complies with the above Rules 0–3, will work correctly even when I/O operations are outstanding during a fail-over.

Alternate Embodiments

While the motivation for the present invention was to make fault tolerance independent of the operating system being used, resulting in a preferred embodiment using virtual processors and virtual machine monitors, the techniques of the present invention could be implemented without using virtual processors and virtual machine monitors. In particular, one could modify the interrupt and trap handling routines of an operating system to (1) buffer interrupts and traps in software maintained structures and (2) deliver (i.e., initiating processing of) the delayed interrupts and traps at predefined points in the instruction stream of a computer. The delivery points would be defined by a recovery register or similar mechanism with additional delivery points occurring as defined by drain instructions. The handling of I/O operations disrupted by a fail-over would be the same as described above. This alternate embodiment of the present invention is suitable for use with RISC processors and satisfies the requirement of needing identical instruction streams in the primary and backup processors even though interrupts and traps may be delayed in each processor in an unpredictable fashion.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A fault tolerant computer system, comprising:

a primary computer for running a primary virtual machine coupled to and monitored by a primary virtual machine monitor;

a backup computer on which is running a backup virtual machine coupled to and monitored by a backup virtual machine monitor; said backup computer coupled to said primary computer for communication of messages therebetween; said primary and backup virtual machines each executing a substantially identical stream of instructions; and a fault detector coupled to said primary computer and said backup computer for sending a fault message to said backup virtual machine monitor when said primary computer fails;

said primary virtual machine monitor including:
   primary interrupt/trap buffer means for trapping and buffering all interrupts and traps associated with operation of said primary virtual machine, for sending copies of said interrupts to said backup virtual machine monitor, and for delivering said buffered interrupts and traps to said primary virtual machine at predefined points in said stream of instructions executed by said primary virtual machine; and
   primary epoch control means for sending a control message to said backup computer each time said primary virtual machine reaches one of said predefined points in said stream of instructions, wherein said control message indicates which instructions the primary virtual machine has just executed;

said backup virtual machine monitor including:
   backup interrupt/trap buffer means for trapping and buffering all traps associated with operation of said backup virtual machine as well as said interrupts sent by said primary virtual machine monitor, and for delivering said buffered interrupts and traps to said backup virtual machine at said predefined points in said stream of instructions executed by said backup virtual machine; and
   backup epoch control means for stopping execution of said stream of instructions by said backup virtual machine at each of said predefined points until said backup computer receives the control message indicating that said primary virtual machine has completed execution of said stream of instructions through a next one of said predefined points in said stream of instructions after the predefined point at which said backup virtual machine is stopped, such that said backup virtual machine's execution of said stream of instructions always lags behind the primary virtual machine's execution of said stream of instructions.

2. The fault tolerant computer system of claim 1, wherein said primary computer and said backup computer both include a respective recovery register that stores a respective counter value that is automatically decremented during execution of said stream of instructions and that generates a respective recovery register interrupt signal when said respective counter value reaches a predefined terminal value and said predefined points in said stream of instructions are identified responsive to corresponding respective recovery register interrupt signals;

said primary and backup epoch control means including means for stopping execution of said primary and backup virtual machines, respectively, and for initializing said recovery register in said primary and backup computers, respectively, to a preselected starting value whenever said respective recovery register interrupt signal is generated.

3. The fault tolerant computer system of claim 2, wherein said primary and backup computers share access to at least one input/output device;

said primary and backup virtual machines' execution of said stream of instructions is divided into a sequence of epochs, each epoch starting when said respective recovery register is initialized and ending when said respective recovery register interrupt signal is generated; wherein each epoch in said sequence of epochs has identical starting and ending points in said primary and backup virtual machines;

said backup virtual machine including:

backup input/output operation means for converting input/output commands to said at least one input/output device into null operation commands so long as said primary computer has not failed;

input/output operation status means for keeping track of all outstanding input/output operations not yet completed; and fail-over means, coupled to said input/output operation status means and responsive to a fault message from said fault detector, for identifying the epoch in said sequence of epochs in which said primary computer failed, deleting all buffered interrupts associated with said identified epoch, establishing a connection to each input/output device for which an input/output operation is outstanding, and reissuing all of said outstanding input/output operations.

4. The fault tolerant computer system of claim 1, wherein said primary and backup computers have pipelined instruction decoders and hardware means for temporarily buffering traps caused by interrupts;

said primary virtual machine monitor includes means for trapping user-mode drain instructions executed by said primary virtual machine, performing a context switch, flushing said traps buffered by said hardware means of said primary computer, and then delivering both the traps that were buffered by said hardware means of said primary computer and any traps buffered by said primary virtual machine monitor to said primary virtual machine; and said backup virtual machine monitor includes means for trapping user-mode drain instructions executed by said backup virtual machine, performing a context switch, flushing said traps buffered by said hardware means of said backup computer, and then delivering both the traps that were buffered by said hardware means of said backup computer and any traps buffered by said backup virtual machine monitor to said backup virtual machine.

5. A fault tolerant computer system, comprising:

a primary computer;

a backup computer coupled to said primary computer for communication of messages therebetween; said primary and backup computers each executing a substantially identical stream of instructions;

a fault detector coupled to said primary computer and said backup computer for sending a fault message to said backup computer when said primary computer fails;

said primary computer including:

primary interrupt/trap buffer means for trapping and buffering all interrupts and traps associated with operation of said primary computer, for sending copies of said interrupts to said backup computer, and for delivering said buffered interrupts and traps to said primary computer at predefined points in said stream of instructions executed by said primary computer; and primary epoch control means for sending a control message to said backup computer each time said primary computer reaches one of said predefined points in said stream of instructions, wherein said control message indicates which instructions the primary computer has just executed;

said backup computer including:

backup interrupt/trap buffer means for trapping and buffering all traps associated with operation of said backup computer as well as said interrupts sent by said primary computer, and for delivering said buffered interrupts and traps to said backup computer at predefined points in said stream of instructions executed by said backup computer;

backup epoch control means for stopping execution of said stream of instructions by said backup computer at each of said predefined points until said backup computer receives the control message indicating that said primary computer has completed execution of said stream of instructions through a next one of said predefined points in said stream of instructions after the predefined point at which said backup computer is stopped, such that said backup computer's execution of said stream of instructions always lags behind the primary computer's execution of said stream of instructions.

6. The fault tolerant computer system of claim 5, wherein said primary computer and said backup computer both include a respective recovery register that stores a respective counter value that is automatically decremented during execution of said stream of instructions and which generates a respective recovery register interrupt signal when said respective counter value reaches a predefined terminal value and said predefined points in said stream of instructions are identified in response to corresponding respective recovery register interrupt signals;

said primary and backup epoch control means including means for initializing said recovery register in said primary and backup computers, respectively, to a preselected starting value whenever said respective recovery register interrupt signal is generated; and said backup epoch control means in said backup computer including means for initiating processing of said buffered interrupts and traps by said backup computer after said recovery register interrupt signal is generated and said backup computer receives from said primary computer the control message indicating that said primary computer has completed execution of said stream of instructions through a next one of said predefined points in said stream of instructions.

7. The fault tolerant computer system of claim 6, wherein said primary and backup computers share access to at least one input/output device;

said primary and backup computers' execution of said streams of instructions is divided into a sequence of epochs, each epoch starting when said respective recovery register is initialized and ending when said respective recovery register interrupt signal is generated; wherein each epoch in said sequence of epochs has identical starting and ending points in said primary and backup computers;

said backup computer including:
  backup input/output operation means for converting input/output commands to said at least one input/output device into null operation commands so long as said primary computer has not failed;
  input/output operation status means for keeping track of all outstanding input/output operations not yet completed; and
  fail-over means, coupled to said input/output operation status means and responsive to a fault message from said fault detector, for identifying the epoch in said sequence of epochs in which said primary computer failed, deleting all buffered interrupts associated with said identified epoch, establishing a connection to each input/output device for which an input/output operation is outstanding, and reissuing all of said outstanding input/output operations.

8. The fault tolerant computer system of claim 5, wherein
said primary and backup computers have pipelined instruction decoders and hardware means for temporarily buffering traps caused by synchronous interrupts;
said primary computer includes means for trapping user-mode drain instructions, performing a context switch, flushing said traps buffered by said hardware means of said primary computer, and then delivering to said primary computer for processing both the traps that were buffered by said hardware means of said primary computer and any traps buffered by said primary computer; and
said backup computer includes means for trapping user-mode drain instructions executed by said backup computer, performing a context switch, flushing said traps buffered by said hardware means of said backup computer, and then delivering both the traps that were buffered by said hardware means of said backup computer and any traps buffered by said backup interrupt/trap buffer means to said backup virtual machine.

9. A fault tolerant data processing method, comprising the steps of:
  running a primary virtual machine on a primary computer and monitoring said primary virtual machine's operation with a primary virtual machine monitor;
  running a backup virtual machine on a backup computer and monitoring said back virtual machine's operation with a backup virtual machine monitor;
  executing a substantially identical stream of instructions on said primary and backup virtual machines;
  sending a fault message to said backup virtual machine monitor when said primary computer fails;
  at said primary computer, trapping and buffering all interrupts and traps associated with operation of said primary virtual machine, sending copies of said interrupts to said backup virtual machine monitor, and delivering said buffered interrupts and traps to said primary virtual machine at predefined points in said stream of instructions executed by said primary virtual machine;
  said primary computer sending a control message to said backup computer each time said primary virtual machine reaches one of said predefined points in said stream of instructions, wherein said control message indicates which instructions the primary virtual machine has just executed; and
  at said backup computer, trapping and buffering all traps associated with operation of said backup virtual machine as well as said interrupts sent by said primary virtual machine monitor;
  stopping execution of said stream of instructions by said backup virtual machine at each of said predefined points; and
  after said stopping step, delivering said buffered interrupts and traps to said backup virtual machine and resuming execution of said stream of instructions by said backup virtual machine when said backup computer receives the control message indicating that said primary virtual machine has completed execution of said stream of instructions through a next one of said predefined points in said stream of instructions after the predefined point at which said backup virtual machine is stopped, such that said backup virtual machine's execution of said stream of instructions always lags behind the primary virtual machine's execution of said stream of instructions.

10. The fault tolerant data processing method of claim 9,
in said primary computer and in said backup computer, decrementing a respective recovery register value during execution of said stream of instructions and generating a respective recovery register interrupt signal when said respective recovery register value reaches a predefined terminal value and said predefined points in said stream of instructions are identified by corresponding respective recovery register interrupt signals;
stopping execution of said primary and backup virtual machines and initializing said recovery register in said primary and backup computers to a preselected starting value whenever said recovery register interrupt signal is generated;
whenever said recovery register interrupt signal is generated in said primary computer, delivering said buffered interrupts and traps to said primary virtual machine and sending an epoch end notification message to said backup virtual machine monitor; and
whenever said recovery register interrupt signal is generated in said backup computer and an epoch end notification message is received, delivering said buffered interrupts and traps to said backup virtual machine.

11. The fault tolerant data processing method of claim 10,
said primary and backup computers sharing access to at least one input/output device;
dividing said primary and backup virtual machines' execution of said stream of instructions into a sequence of epochs, each epoch starting when said respective recovery register is initialized and ending when said respective recovery register interrupt signal is generated; wherein each epoch in said sequence of epochs has identical starting and ending points in said primary and backup virtual machines;
said backup virtual machine performing the steps of:
  converting input/output commands to said at least one input/output device into null operation commands so long as said primary computer has not failed;
  keeping track of all outstanding input/output operations not yet completed; and
  responsive to said fault message, identifying the epoch in said sequence of epochs during which said primary computer failed, deleting all buffered interrupts associated with said identified epoch, establishing a connection to each input/output device for which an input/output operation is outstanding, and reissuing all of said outstanding input/output operations.

12. The fault tolerant processing method of claim 11, wherein said primary and backup computers have pipelined instruction decoders and hardware means for temporarily buffering traps caused by synchronous interrupts;

said method including the steps of, at said primary and backup computers, temporarily buffering in said hardware means trams caused by synchronous interrupts;

at said primary computer, trapping user-mode drain instructions executed by said primary virtual machine monitor, performing a context switch, flushing said traps buffered by said hardware means of said primary computer, and then delivering both the traps that were buffered by said hardware means of said primary computer and any traps buffered by said primary virtual machine monitor to said primary virtual machine; and at said backup computer, trapping user-mode drain instructions executed by said backup virtual machine monitor, performing a context switch, flushing said traps buffered by said hardware means of said backup computer, and then delivering both the traps that were buffered by said hardware means of said backup computer and any traps buffered by said backup virtual machine monitor to said backup virtual machine.

13. A fault tolerant data processing method, comprising the steps of:

executing a substantially identical stream of instructions in a primary computer and a backup computer;

sending a fault message to said backup computer when said primary computer fails;

at said primary computer, trapping and buffering all interrupts and traps associated with operation of said primary computer, sending copies of said interrupts to said backup computer, and initiating processing of said buffered interrupts and traps by said primary computer at predefined points in said stream of instructions executed by said primary computer;

said primary computer sending a control message to said backup computer each time said primary computer reaches one of said predefined points in said stream of instructions, wherein said control message indicates which instructions the primary computer has just executed;

at said backup computer, trapping and buffering all traps associated with operation of said backup computer as well as said interrupts sent by said primary computer;

stopping execution of said stream of instructions by said backup computer at each of said predefined points; and after said stopping step, initiating processing of said buffered interrupts and traps by said backup computer and resuming execution of said stream of instructions by said backup computer when said backup computer receives the control message indicating that said primary computer has completed execution of said stream of instructions through a next one of said predefined points in said stream of instructions after the predefined point at which said backup computer is stopped, such that said backup computer's execution of said stream of instructions always lags behind the primary commuter's execution of said stream of instructions.

14. The fault tolerant data processing method of claim 13, in said primary computer and in said backup computer, decrementing a respective recovery register value during execution of said stream of instructions and generative a respective recovery register interrupt signal when said respective recovery register value reaches a predefined terminal value and said predefined points in said stream of instructions are identified by corresponding respective recovery register interrupt signals;

at said primary computer, whenever said recover register interrupt signal is generated, initializing said recovery register in said primary computer to a preselected staring value, initiating processing of said buffered interrupts and traps by said primary computer whenever said recovery register interrupt signal is generated, and sending said control message to said backup computer; and at said backup computer, after said recovery register interrupt signal is generated and said control message is received from said primary computer, initializing said recovery register in said backup computer to said preselected starting value and initiating processing of said buffered interrupts and traps by said backup computer.

15. The fault tolerant data processing method of claim 14, said primary and backup computers sharing access to at least one input/output device;

dividing said primary and backup computers' execution of said streams of instructions into a sequence of epochs, each epoch starting when said respective recovery register is initialized and ending when said respective recovery register interrupt signal is generated; wherein each epoch in said sequence of epochs has identical starting and ending points in said primary and backup commuters;

said backup computer performing the steps of:

converting input/output commands to said at least one input/output device into null operation commands so long as said primary computer has not failed;

keeping track of all outstanding input/output operations not yet completed; and responsive to said fault message, identifying the epoch in said sequence of epochs during which said primary computer failed, deleting all buffered interrupts associated with said identified epoch, establishing a connection to each input/output device for which an input/output operation is outstanding, and reissuing all of said outstanding input/output operations.

16. The fault tolerant processing method of claim 15, wherein said primary and backup computers have pipelined instruction decoders and hardware means for temporarily buffering traps caused by synchronous interrupts;

said method including the steps of at said primary and backup computers, temporarily buffering in said hardware means traps caused by synchronous interrupts;

at said primary computer, trapping user-mode drain instructions executed by said primary computer, performing a context switch, flushing said traps buffered by said hardware means of said primary computer, and then initiating processing by said primary computer of both the traps that were buffered by said hardware means of said primary computer and any traps buffered by said primary computer; and at said backup computer, trapping user-mode drain instructions executed by said backup computer, performing a context switch, flushing said traps buffered by said hardware means of said backup computer, and then initiating processing by said backup computer of both the traps that were buffered by said hardware means of said backup computer and any traps buffered by said backup computer.

* * * * *